(12) United States Patent
Watanabe (10) Patent No.: US 7,388,492 B2
(45) Date of Patent: Jun. 17, 2008

(54) PALLET RECYCLING SYSTEM, RADIO TAG, PALLET, AND MANAGEMENT METHOD AND PROGRAM

(75) Inventor: Toshio Watanabe, Minamiashigara (JP)

(73) Assignee: Fuji Xerox Co., Ltd., Tokyo (JP)

(*) Notice: Subject to any disclaimer, the term of this patent is extended or adjusted under 35 U.S.C. 154(b) by 196 days.

(21) Appl. No.: 11/215,705

(22) Filed: Aug. 30, 2005

(65) Prior Publication Data

US 2006/0212165 A1 Sep. 21, 2006

(30) Foreign Application Priority Data

Mar. 14, 2005 (JP) ............................. 2005-070480

(51) Int. Cl.
*G08B 13/14* (2006.01)

(52) U.S. Cl. .................. 340/572.1; 340/572.8; 340/505; 340/539.13; 340/568.1; 340/825.36; 340/10.1; 340/10.3; 235/375; 235/383; 235/385

(58) Field of Classification Search ............. 340/572.1, 340/572.8, 568.1, 539.13, 505, 825.36, 825.49, 340/10.1, 10.3, 10.4, 10.51; 235/375, 383, 235/385

See application file for complete search history.

(56) References Cited

U.S. PATENT DOCUMENTS

| | | | | |
|---|---|---|---|---|
| 5,662,048 A | * | 9/1997 | Kralj et al. | 108/56.3 |
| 5,953,234 A | * | 9/1999 | Singer et al. | 700/214 |
| 5,971,592 A | * | 10/1999 | Kralj et al. | 700/225 |
| 6,943,678 B2 | * | 9/2005 | Muirhead | 340/505 |
| 7,034,683 B2 | * | 4/2006 | Ghazarian | 340/568.1 |
| 2004/0083120 A1 | | 4/2004 | Sandoval | |
| 2005/0076816 A1 | | 4/2005 | Nakano | |
| 2005/0199716 A1 | | 9/2005 | Shafer et al. | |
| 2005/0237184 A1 | | 10/2005 | Muirhead | |
| 2005/0241548 A1 | | 11/2005 | Muirhead | |
| 2006/0243174 A1 | | 11/2006 | Muirhead | |
| 2007/0137531 A1 | | 6/2007 | Muirhead | |

FOREIGN PATENT DOCUMENTS

| | | |
|---|---|---|
| JP | 9110137 | 4/1997 |
| JP | 2002019925 | 1/2002 |
| JP | 2004118756 | 4/2004 |

OTHER PUBLICATIONS

Information technology-Radio frequency identification for item management Part 7: Parameters for active air interface communications at 433MHz; Published by Standards Australia GPO Box 476, Aydney, NSW 2001, Australia; AS ISO/IEC 18000.7-2007; 7 pages.
Letter of Feb. 27, 2008 from Scott Muirhead of Nextreme, LLC to Matthew E. Connors of Gauthier & Connors, LLP.

* cited by examiner

*Primary Examiner*—Hung Nguyen
(74) *Attorney, Agent, or Firm*—Gauthier & Connors LLP (57) ABSTRACT

A pallet recycling system for managing a pallet to support pallet recycling, comprising:
 a managing section connected to a network that manages a pallet distribution;
 a radio tag given to the pallet that records and transmits a pallet distribution; and
 a tag reader/writer that reads out the pallet distribution information recorded in the radio tag and writes the pallet distribution information into the radio tag, and communicates with the managing section,
wherein
 the radio tag has a reading out region where an information on a pallet owner is recorded, and a dedicated memory region where an user information is able to be read out or written in using the tag reader/writer.

18 Claims, 12 Drawing Sheets

RADIO TAG ID T-1001
PALLET ID   P-1234         "FUJI XEROX"  "TAKEMATSU OFFICE"

| No | INSPECTION DATE | INSPECTION TIME | LOCATION INFORMATION | PALLET CONDITION | INITIAL CHARGE | RECOLLECTION ORDER |
|---|---|---|---|---|---|---|
| 1 | 2005/2/1 | 9:30 | TERMINAL A | ON-BOARD, SHIP OUT | ¥6,000 | ORDERED |
| 2 | 2005/2/2 | 10:00 | TERMINAL B | ON-BOARD, SHIP IN | ¥5,900 | ↑ |
| 3 | 2005/2/2 | 10:30 | TERMINAL B | EMPTY, STORE | | ↑ |
| 4 | 2005/2/3 | 9:30 | TERMINAL B | EMPTY, FORWARDING | ¥5,800 | FORWARDING |
| 5 | 2005/2/3 | 10:00 | TERMINAL A | ON-BOARD, SHIP IN | ¥5,700 | COMPLETE |
| 10 | 2005/2/10 | 11:00 | TERMINAL A | ON-BOARD, SHIP OUT | ¥5,000 | NOT ORDERED |
| 11 | 2005/2/11 | 13:00 | TERMINAL B | ON-BOARD, SHIP IN | ¥4,900 | ↑ |
| 12 | 2005/2/11 | 14:00 | TERMINAL B | EMPTY, STORE | | ↑ |
| 13 | 2005/2/12 | 9:30 | TERMINAL B | ON-BOARD, SHIP OUT | ¥4,800 | NOT ORDERED |
| 14 | 2005/2/13 | 10:00 | ASSOCIATED COMPANY D | ON-BOARD, SHIP IN | ¥4,700 | ↑ |
| 15 | 2005/2/13 | 11:00 | ASSOCIATED COMPANY D | EMPTY, STORE | | ↑ |
| 16 | 2006/12/5 | 14:00 | NON-ASSOCIATED COMPANY F | EMPTY, FOUND | ¥4,600 | RECOLLECTION ORDERED |

PALLET RECYCLING SYSTEM, RADIO TAG, PALLET, AND MANAGEMENT METHOD AND PROGRAM

PRIORITY INFORMATION

This application claims priority to Japanese Patent Application No. 2005-070480, filed Mar. 14, 2005, which is incorporated herein by reference in its entirety.

BACKGROUND OF THE INVENTION

1. Field of the Invention

The present invention relates to a pallet management system for efficiently using a reusable (hereinafter referred to as "returnable") pallet while utilizing a radio tag in transportation across a wide distribution region, and also to a pallet, a radio tag, and a management method and program all necessary for the pallet management system.

2. Description of the Related Art

In commodity transportation involving a plurality of commodity distribution terminals, pallets are often used as these are easy to manage and transport. In conjunction with such pallets, radio tags (referred also as RFID: Radio Frequency Identification) are also widely used, and a number of systems for efficiently managing the demand and supply of pallets in commodity transportation while using a radio tag have been proposed.

Meanwhile, there has been a growing demand for use of returnable, reusable pallets in consideration of environmental issues and agreements such as the "Carbon Oxide Emission Regulation".

Returnable pallets are typical made of wood or plastic. Wooden pallets are less durable than plastic pallets, and present a greater difficulty in providing a space for accommodating a radio tag while retaining sufficient strength. Further, because wooden pallets are subject to wood import regulations similar to plant quarantine, all wooden pallets must be subjected to the appropriate types and methods for processing so as to conform with the regulations, which may differ from country to country. However, wooden pallets are still advantageous to plastic pallets in terms of their lower cost.

While plastic pallets are superior in durability, and also in environmental point of view as waste plastic can be recycled or used as fuel in thermal recycling, plastic pallets cost several times as much as wooden pallets due to molding die costs, even when made from waste plastic stock.

Figure 2:
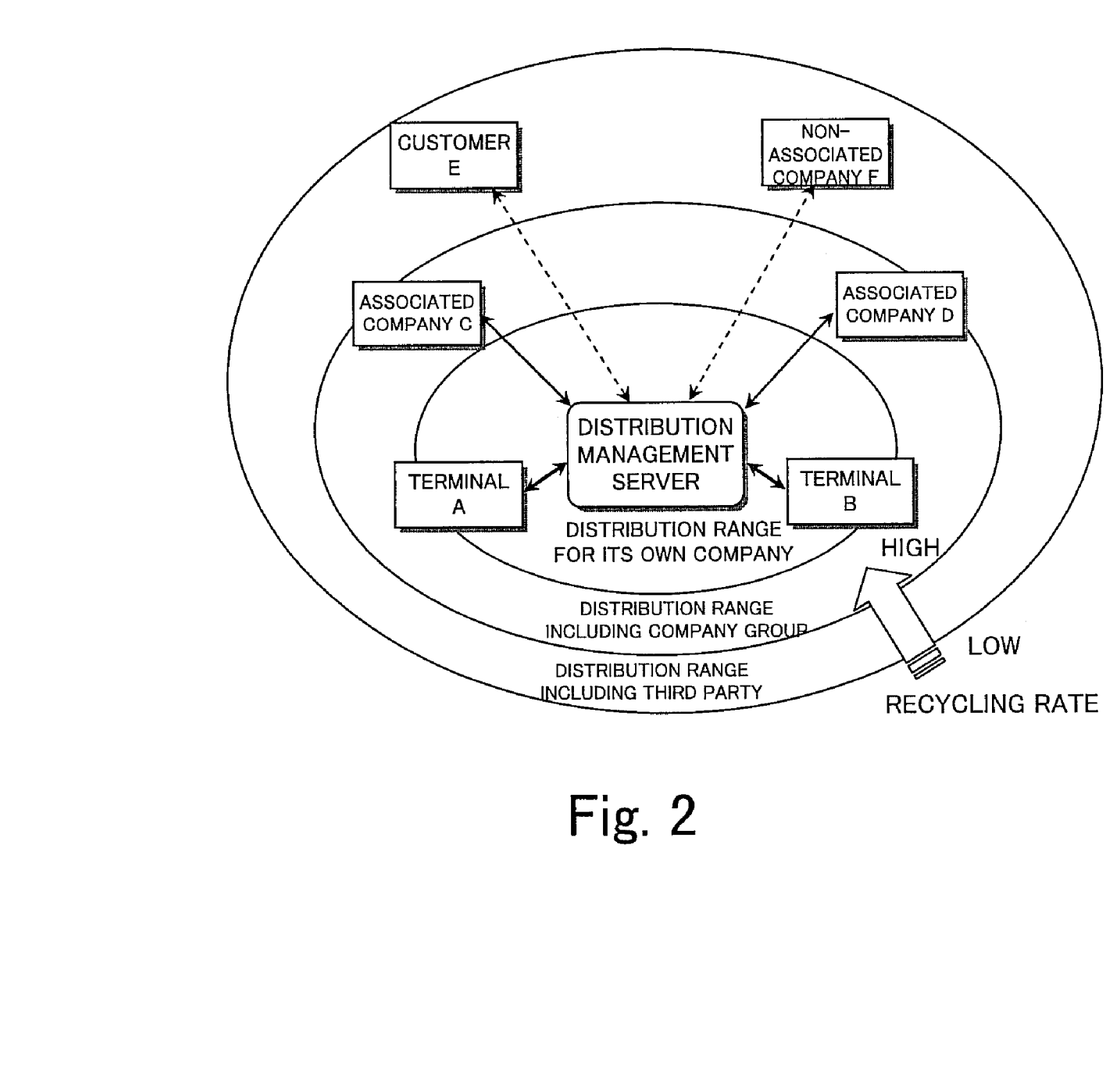
FIG. 2 is a diagram explaining pallet recycling ratios, which is referred to in conception of the present invention, within a commodity distribution ranges involving a single company, a corporate group, and a third party.

FIG. 2 is a diagram which was referred to in conceiving the present invention. The diagram shows the rates of recycling of pallets within respective commodity distribution ranges, one being the company which is originally entitled to possesses the pallet (hereinafter referred to as the pallet owner), another involving the pallet owner and a company group (corporate group) including associated or group companies, and still another involving the pallet owner, a company group, and a third party such as a customer or another company not associated with either its own company or a company group.

As shown, a high pallet recycling rate results when the pallet distribution range involves only a single company, but the rate drops when the distribution ranges extends to a corporate group or to include a third party.

In general, it is rare for a single company or manufacturing entity to receive a certain quantity of commodities transported using pallets and to ship out different commodities of the same quantity. In overseas commodity distribution, in particular, given the extra transportation cost of returning empty pallets, disposable wooden pallets, which need not to be returned, are preferable in terms of cost. This hinders spread of plastic pallets which are superior in an environmental point of view.

As a solution of this problem, a rental pallet management technique for renting a pallet to a plurality of companies under contract has been disclosed.

When a rental pallet management system is introduced using a plastic pallet in order to promote returnable use of a pallet, a radio tag is attached to each pallet so that transportation of a pallet is managed using a reader for the radio tag, installed in each terminal and a server connected to the reader through a network. With this arrangement, pallet supply and demand can be efficiently managed.

However, in actual business practice, new resources are put into use without limitation as, for example, new pallets are put into use in order to compensate for lost pallets equipped with radio tags or shortage of pallets in international commodity distribution across many companies. Moreover, costs continue to increase as empty pallets are transported without limitation, with insufficient consideration to environmental issues, leading to the disposal of empty pallets.

In general, each radio tag has only a serial number, and other attribute data, while traceable using the serial number, are collectively managed by a server. However, should a pallet be de-routed, either intentionally or accidentally, the pallet falls out of the scope of management.

Consequently, the introduction of rental pallets in international commodity distribution has been limited to a limited number of companies. Moreover, the lag in distribution and adoption of readers has led in a deficiency of effective measures to prevent missing pallets.

SUMMARY OF THE INVENTION

The present invention has been made in view of the above circumstances and provides a pallet recycling system. According to the embodiment of the present invention, the system manages a pallet to support pallet recycling, comprising:

a managing section connected to a network that manages a pallet distribution;

a radio tag given to the pallet that records and transmits a pallet distribution; and a tag reader/writer that reads out the pallet distribution information recorded in the radio tag and writes the pallet distribution information into the radio tag, and communicates with the managing section, wherein the radio tag has a reading out region where an information on a pallet owner is recorded, and a dedicated memory region where an user information is able to be read out or written in using the tag reader/writer.

DESCRIPTION OF THE EMBODIMENTS

Embodiments of the present invention will be described with reference to the accompanied drawings.

Figure 1:
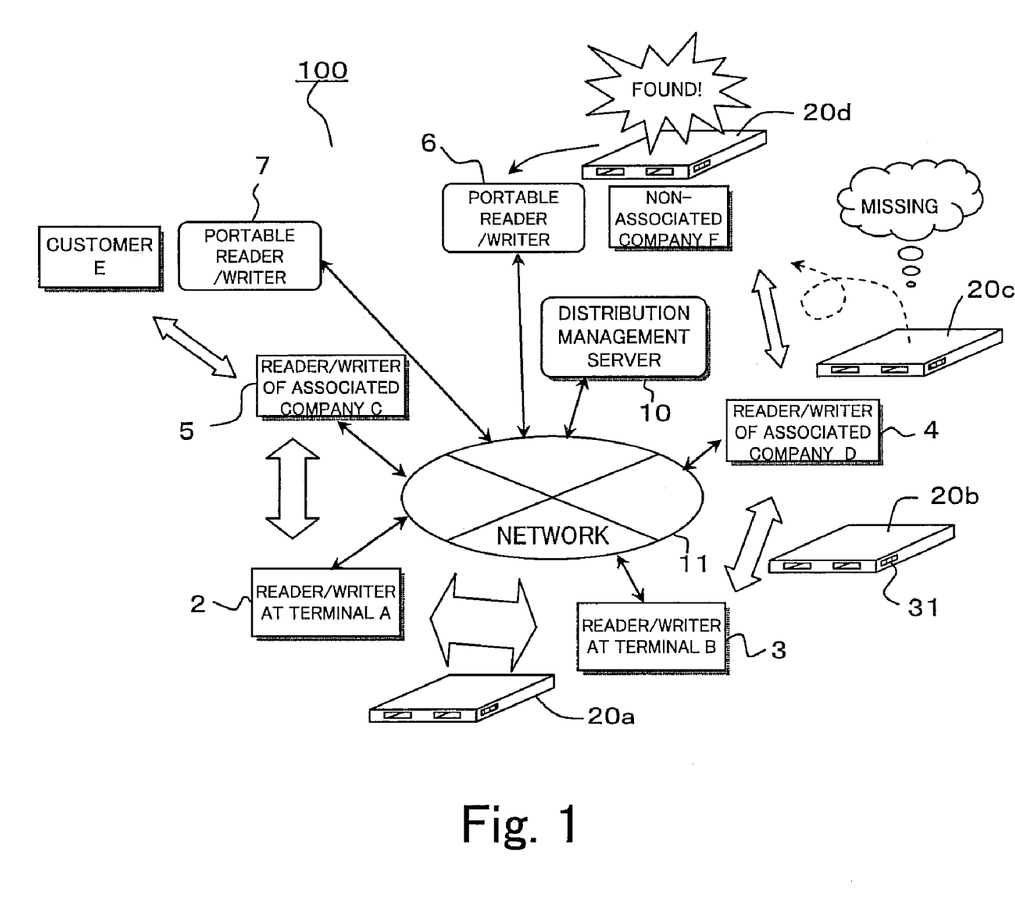
FIG. 1 is a diagram showing a schematic structure of a pallet recycling system according to the present invention together with indications of transportation of a pallet managed by the pallet recycling system within a distribution area involving the pallet owner, a corporate group, and a third party.

FIG. 1 is a diagram showing a schematic structure of a pallet recycling system 100 and indications of transportation of a pallet 20, managed by the pallet recycling system 100 of the present invention, within a commodity distribution range involving its own company, a company group, and a third party. Each of the terminals and associated companies included in a company group has a reader/writer (2, 3, 4, 5) for a radio tag, installed in a major gate therein, and each of the third parties including customers and companies which are not associated with either its own company or the company group has an inexpensive portable reader/writer (6, 7). The respective reader/writers and a distribution management server 10 are connected to a network 11.

Figure 3:
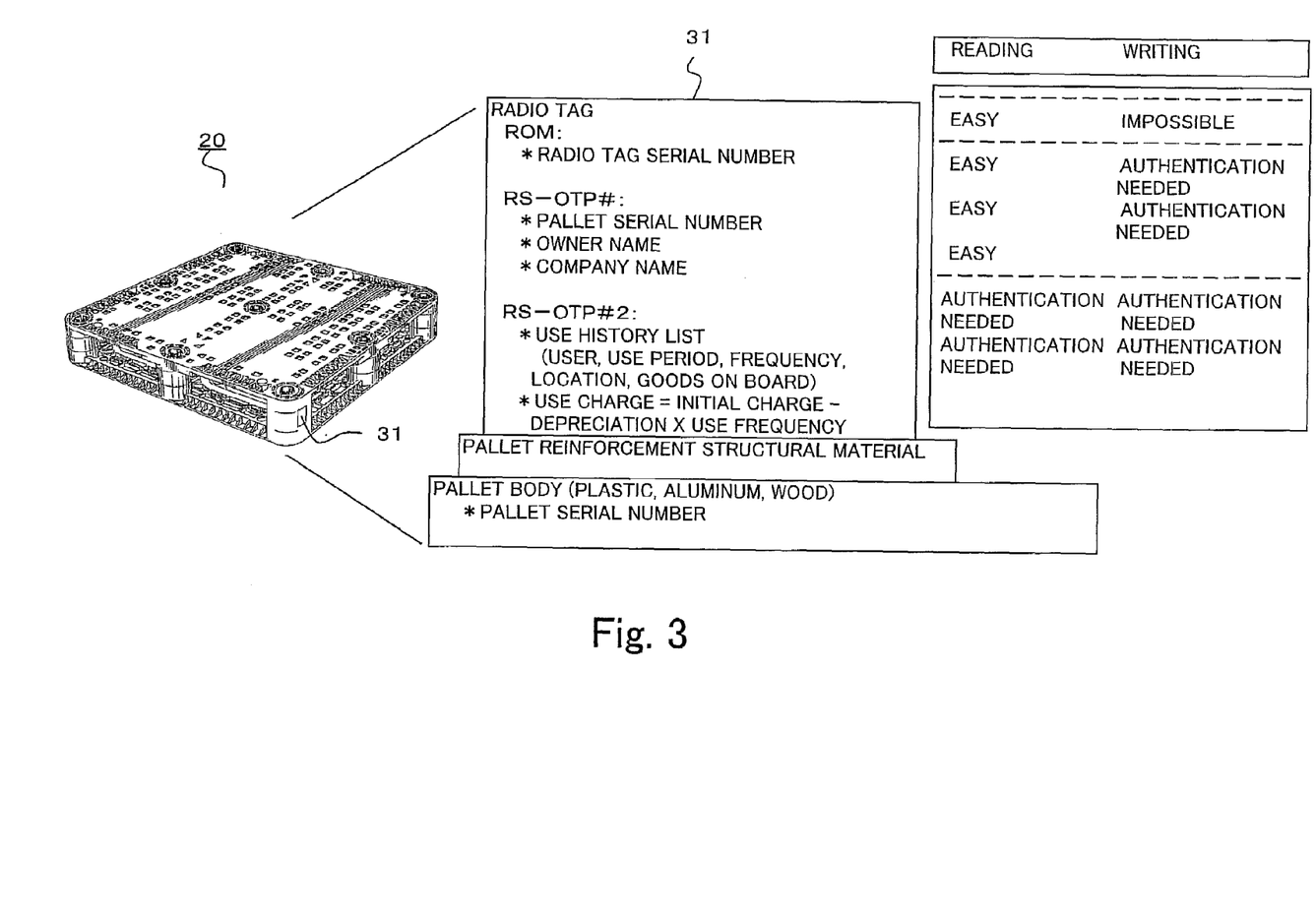
FIG. 3 is a diagram showing a structure of a pallet together with a data structure of a radio tag given to the pallet in an embodiment of the present invention.

FIG. 3 is a diagram showing a structure of a plastic pallet 20 and a data structure of a radio tag 31 attached to the pallet 20. An active-type radio tag 31 for transmitting and receiving a UHF band electromagnetic signal is encapsulated within the structural member for reinforcement of the pallet 20.

Each radio tag 31 has a memory region constituting of three sections, namely, a ROM (read only memory) and two RS-OTPs (Re-Settable One Time Programmable Memory, or a memory region which can be rewritten only using a reader/writer incorporating a confidentiality management program).

The serial number of a radio tag is recorded in the ROM. The serial number of the pallet 20 and the names of the individual or company owning the pallet 20 and the company or group entitled to use the pallet 20 are recorded in the first RS-OTP. Use history, including the name of a user, charge for use, a period, frequency, and location of use, and goods on board, is recorded in the second RS-OTP each time the pallet is used. The use history is provided to the distribution management server 10 for collective management of the information regarding the latest use of the pallet.

Here, it sometimes happens that a pallet 20 is lost or diverted to a third party after use. The loss or diversion of a plastic pallet, which is expensive as described above, results insignificant economic damage. In order to prevent such damage, in this embodiment, a monetary figure corresponding to the damage which would be caused should the pallet be lost is set when a person/entity other than the owner wishes to use the pallet 50 so that damage to the pallet owner can be prevented.

In particular, when a pallet is rented to a person/entity outside of the company owning the pallet, a surcharge depending on the period of use by the person/entity is imposed on the person/entity, and the surcharged money is allotted to depreciation of the initial investment, including the pallet, radio tag, management expense, and so forth. This is similar to a rental pallet.

A difference from a rental pallet is that a charge for using a returnable pallet should be determined in such a manner as to encourage the spread of portable reader/writers in order to enhance the rate of return. That is, preferably, an inexpensive charge, as compared to a rental fee, is set for a returnable pallet, though a returnable pallet charge equal to a rental charge may also be acceptable.

Figure 4:
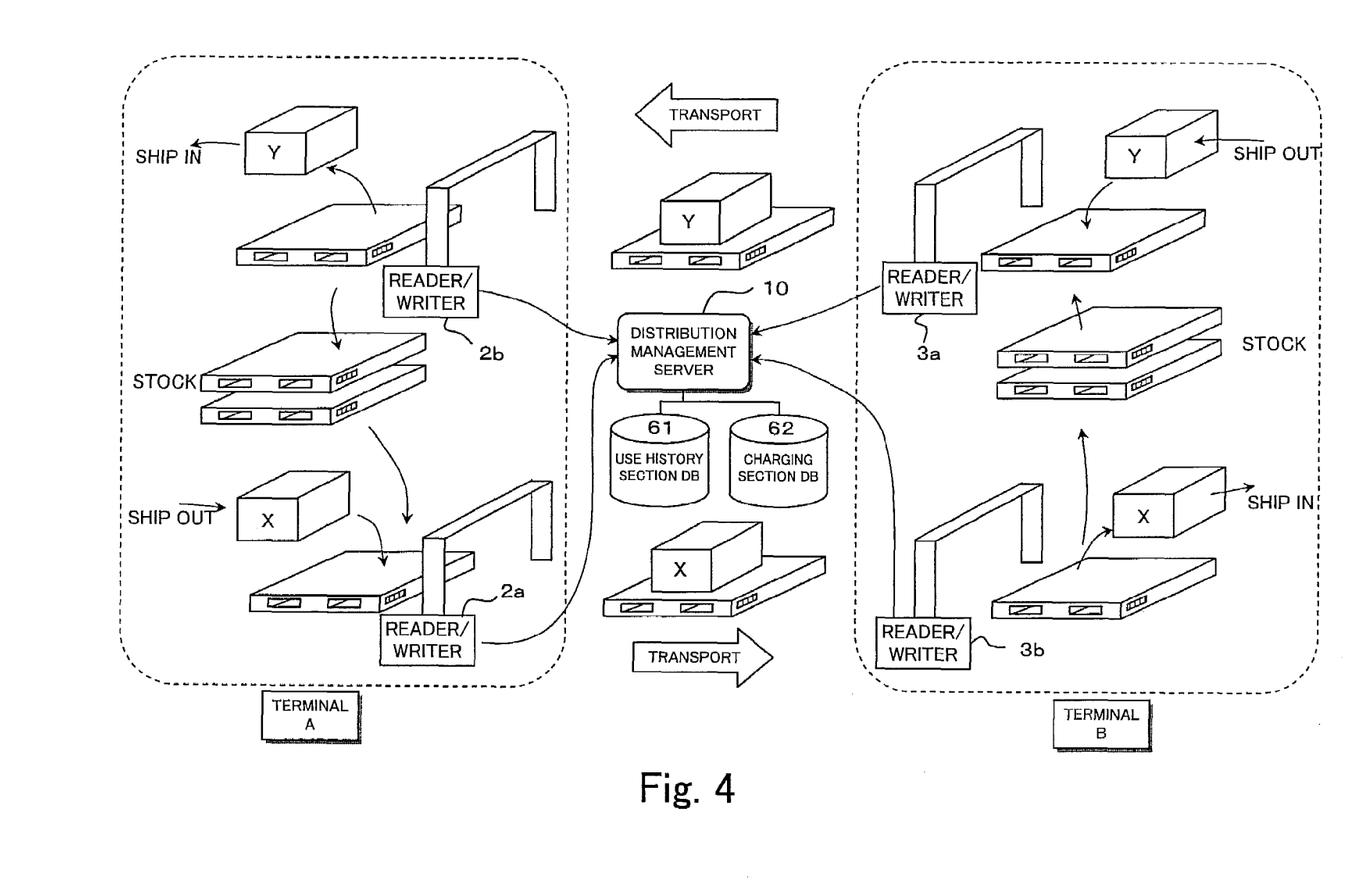
FIG. 4 is a diagram showing a schematic structure of a pallet recycling system according to the present invention together with indications of transportation of a pallet managed by the pallet recycling system within a distribution range involving a third party.

FIG. 4 is a diagram showing a schematic structure of a recycling system for a pallet 20 and indications of transportation of the pallet 20, managed by the pallet recycling system 100 of the present invention, within a commodity distribution range involving the pallet owner and a corporate group.

Specifically, FIG. 4 shows an example of large-scale distribution between Terminals A and B belonging to the pallet owner or among group companies. In this case, a reader/writer for a radio tag 31 is installed at a major gate of the respective facilities for the commodity distribution. As the communication region of an active-type radio tag 31 attached to each pallet 20 is as wide as 10 m to 15 m, it is possible to write distribution information on the pallet 20 into the memory region of the radio tag 31, as well as the use history section DB61 and charge section DB62 of the distribution management server 10, when the reader/writer is merely placed within the communication region of the radio tag 31, that is, without the need of employing a step of inspection of each radio tag 31.

Figure 5:
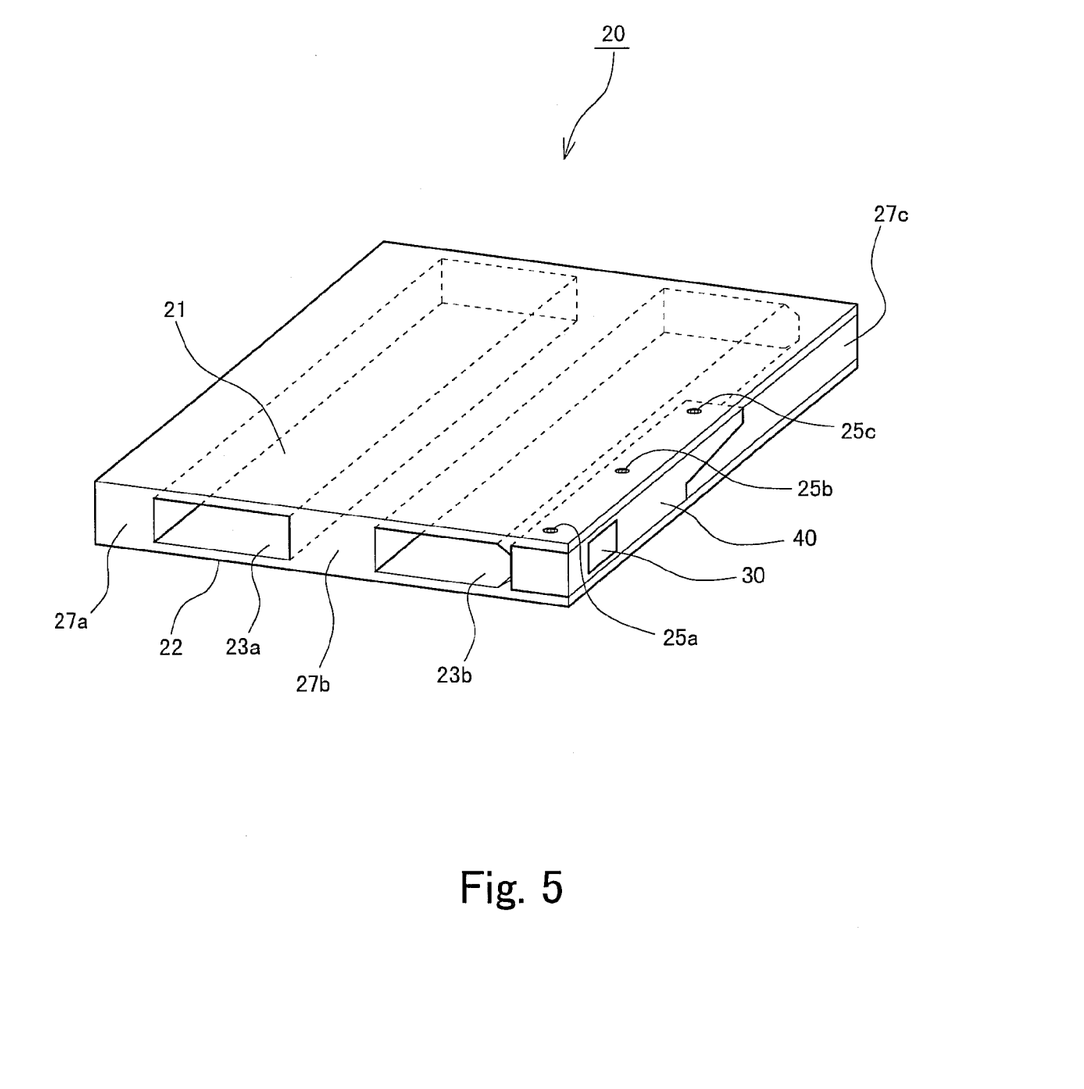
FIG. 5 is a perspective view showing a structure of a two-way pallet in a first embodiment of the present invention.

FIG. 5 is a perspective view showing a structure of a two-way pallet 20 in the first embodiment of the present invention. A two-way pallet 20 is a pallet 20 into which the fork of a fork lift can be inserted from two directions. The two-way pallet 20 comprises a beam 27 located between a lower deck board 22 on the lower plate of the pallet 20 and an upper deck board 21 on the upper plate of the pallet 20, and a beam block 40 having a radio tag 31 embedded (encapsulated or installed) therein.

The radio tag 31 is covered by a cover cap 30 rigidly attached to the beam block 40 so as not to be easily detached. With the beam block 40 disassembled, the pallet does not serve as a pallet.

Figure 6:
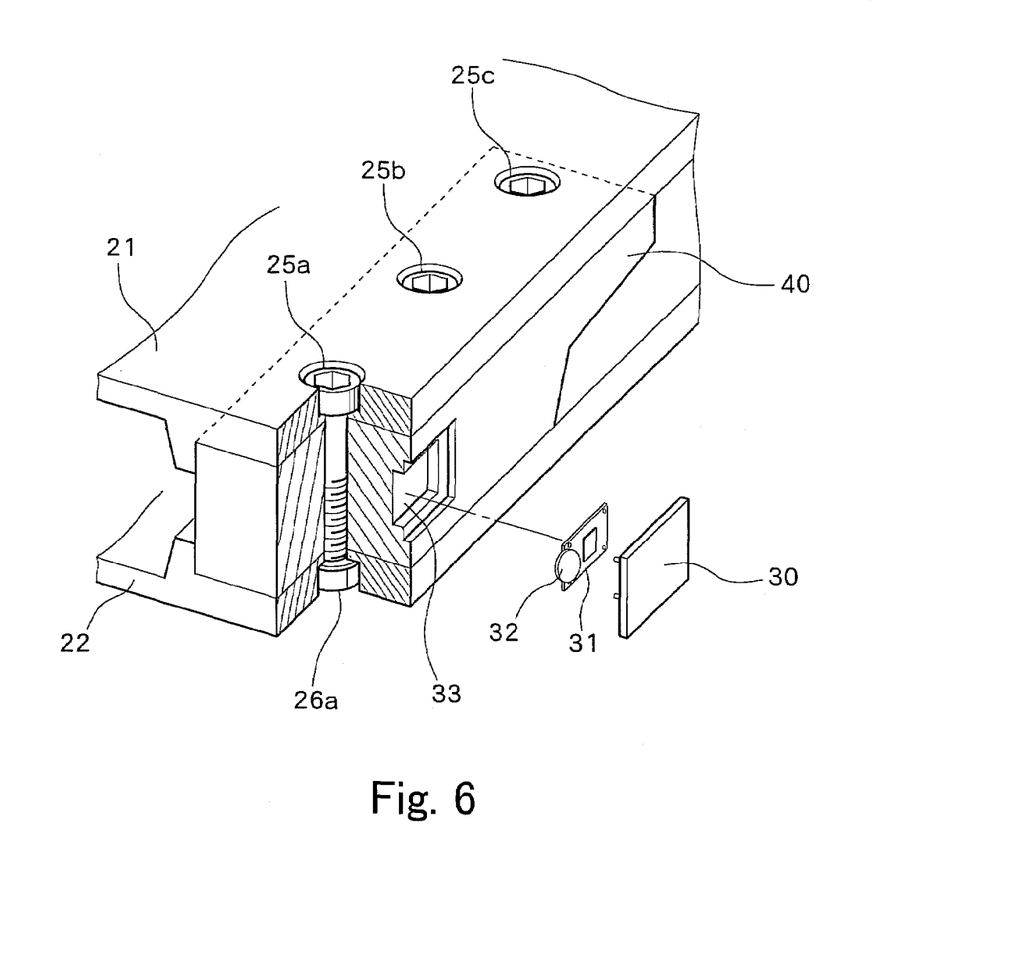
FIG. 6 is a close-up perspective view showing a beam block of a two-way pallet in the embodiment of the present invention.

FIG. 6 is a close up perspective view of the beam block 40 of the two-way pallet 20 in the first embodiment of the present invention. The beam block 40 is fixed to the pallet 20 using two bolts 25 while being sandwiched between the upper deck board 21 and lower deck board 22, and also fixed using one bolt while being engaged with a beam.

The radio tag 31, having a button battery 32 and fitted into the substrate pressure of the cover cap 30, is inserted into a storage section 33 of the beam block 40, and a cover cap 30 is thereafter adhered to the beam block 40 using a supersonic adherer.

Figure 7:
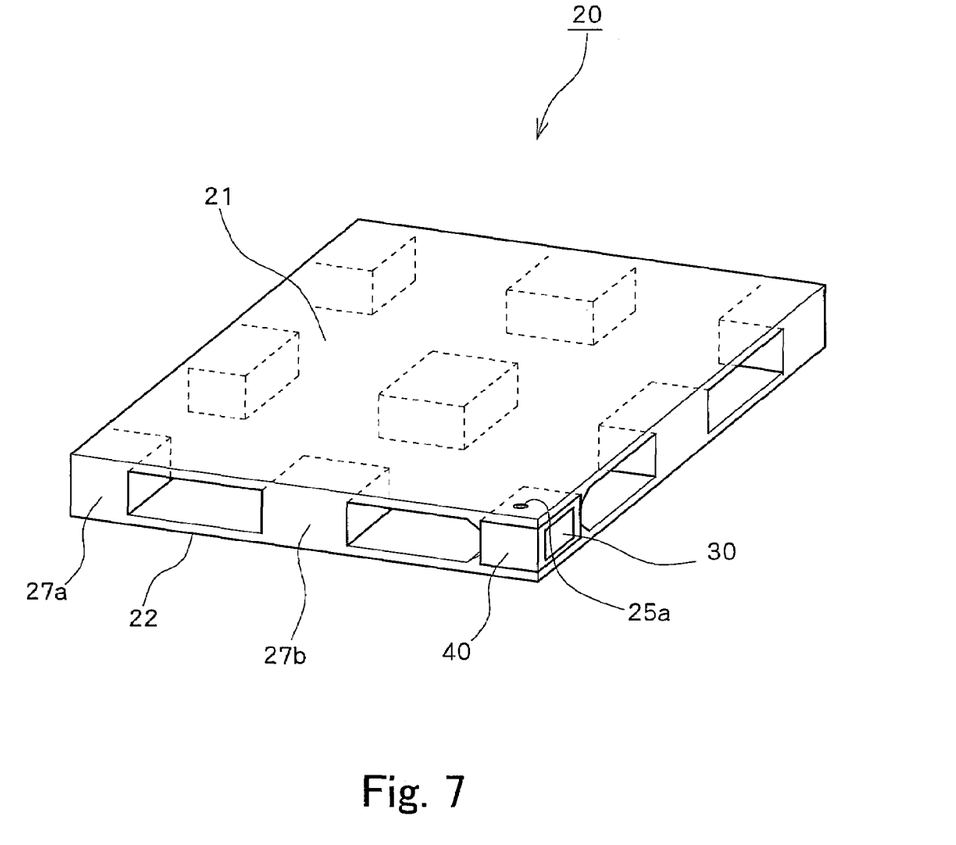
FIG. 7 is a perspective view showing a structure of a four-way pallet in a second embodiment of the present invention.

FIG. 7 is a perspective view showing a structure of a four-way pallet 20 according to second embodiment of the present invention. The four-way pallet 20 is a pallet 20 into which the fork of a forklift can be inserted from four directions. The four-way pallet 20 comprises eight block beams 27 arranged between the lower deck board 22 on the lower plate of the pallet 20 and the upper deck board 21 on the upper plate of the pallet 20, and a beam block 40 having a radio tag 31 embedded therein. The radio tag 31 is covered by a cover cap 30 so as not to be easily detached.

Figure 8:
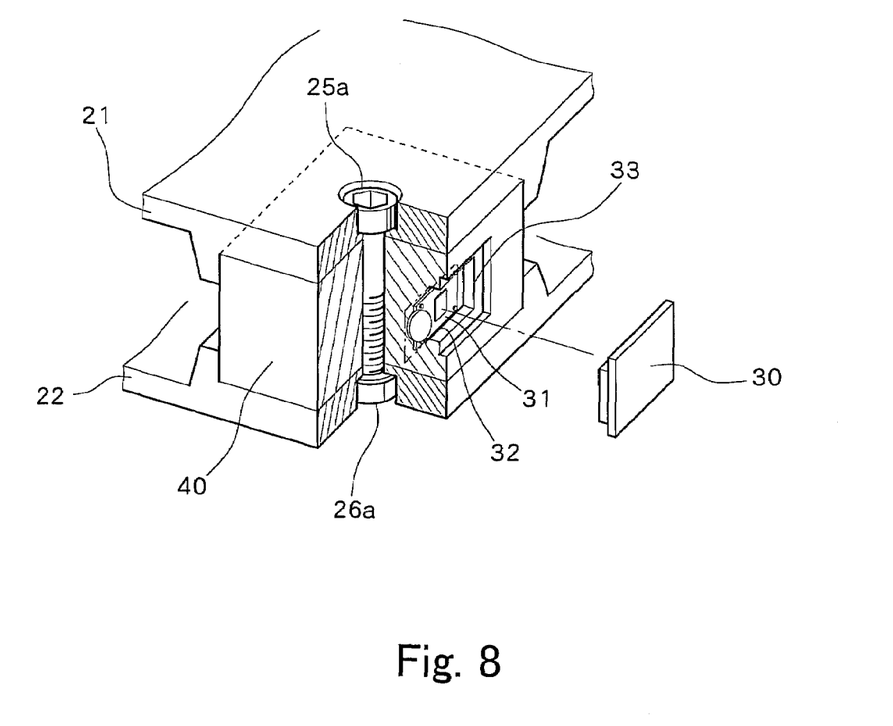
FIG. 8 is a close up perspective view showing a beam block of a four-way pallet in the second embodiment of the present invention.

FIG. 8 is a close up perspective view of the beam block 40 of the four-way pallet 20 in the second embodiment of the present invention. The beam block 40 is fixed to the pallet 20 while being sandwiched between the upper deck board 21 and lower deck board 22, using one bolt 25a and by means of stoppers formed along two edges of the pallet 20.

The radio tag 31, having a button battery 32, is fitted into the substrate pressure formed in the storage section 33 of the beam block 40, and covered by a cover cap 30. It should be noted that, although the cap 30 is adhered in this embodiment, the cap 30 may be fixed in any other manners as long as the attachment is rigid enough so as not to readily allow removal of the cap 30.

Figure 9:
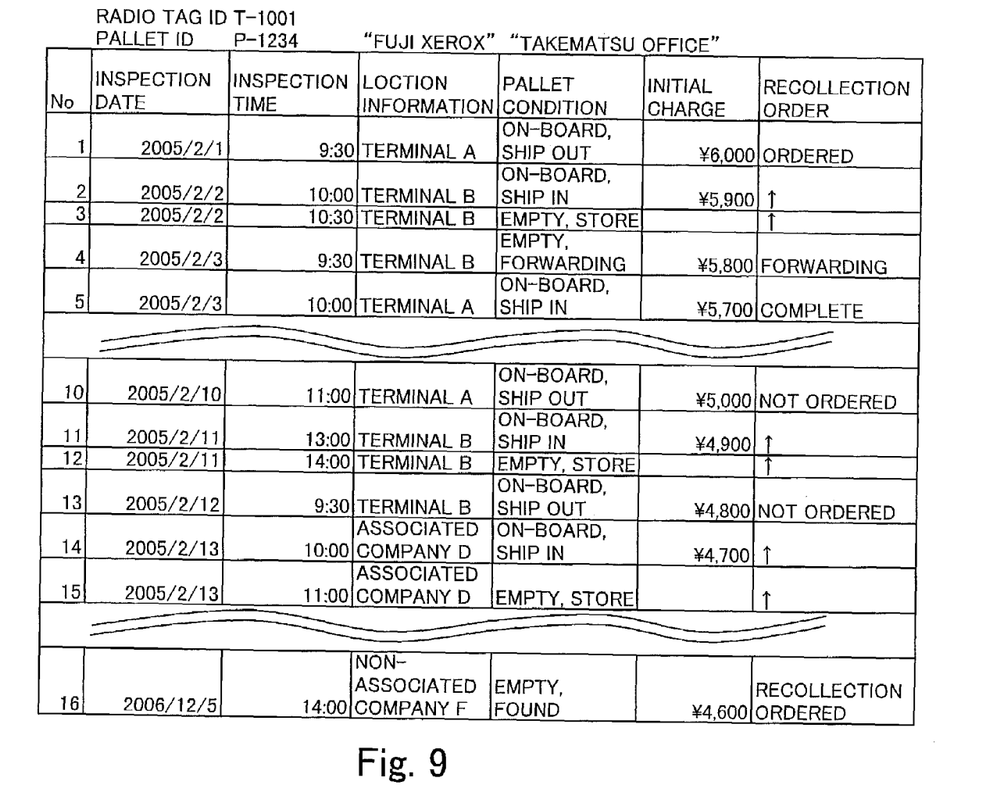
FIG. 9 is a diagram explaining data recorded in a radio tag in an embodiment of the present invention.

FIG. 9 is a diagram explaining information recorded in the radio tag 31 in this embodiment of the present invention. Specifically, a radio tag ID is recorded in the ROM; a pallet ID, and information such as "Fuji Xerox" and "Takematsu Office" are recorded in the first RS-OTP; and use history is stored in the second RS-OTP.

Use history includes information such as a record number, inspection date and time, location, pallet condition, initial charge, and purpose of recollection. Specifically, use history items numbered 1 to 5 in the drawing concern distribution from Terminal A to Terminal B and recollection of an empty pallet A completed at Terminal A.

The initial charge represents the price of the pallet 20, which is reduced every time the pallet 20 is used. A user is charged (for example, 100 yen) every time they use the pallet 20. In the case of the drawing, as the owner and user of the pallet 20 are the same, the initial charge is recorded only for the purpose of recording depreciation, but not for charging.

The use history items numbered 10 to 15 in the drawing concern commodity distribution from Terminal A, via Terminal B, to the associated company D, where the pallet 20 is kept, and to the process of loss and recovery of the pallet 20. As shown, the lost pallet 20 is found upon detection by a portable reader/writer 20 of the non-associated company F, as shown by the use history item numbered 16. The finding is informed to the distribution management server 10.

Specifically, when the pallet 20 is not returned to where it is supposed to be kept according to the use history within a predetermined period of time, the system determines that the pallet 20 is lost, and responsibility of the last user, or the associated company D in this case, is accounted for by being charged the initial charge. It should be noted that, when the missing pallet 20 is returned to where it is supposed to be kept, or the associated company D in this case, within a predetermined period of time in response to a return request, the company D is exempted from being charged with an initial charge.

With this arrangement, responsibility of loss of a pallet, which is conventionally unclear, is clarified because the use history is clearly recorded in the radio tag 31. This promotes returnable use of a pallet 20.

Figure 10:
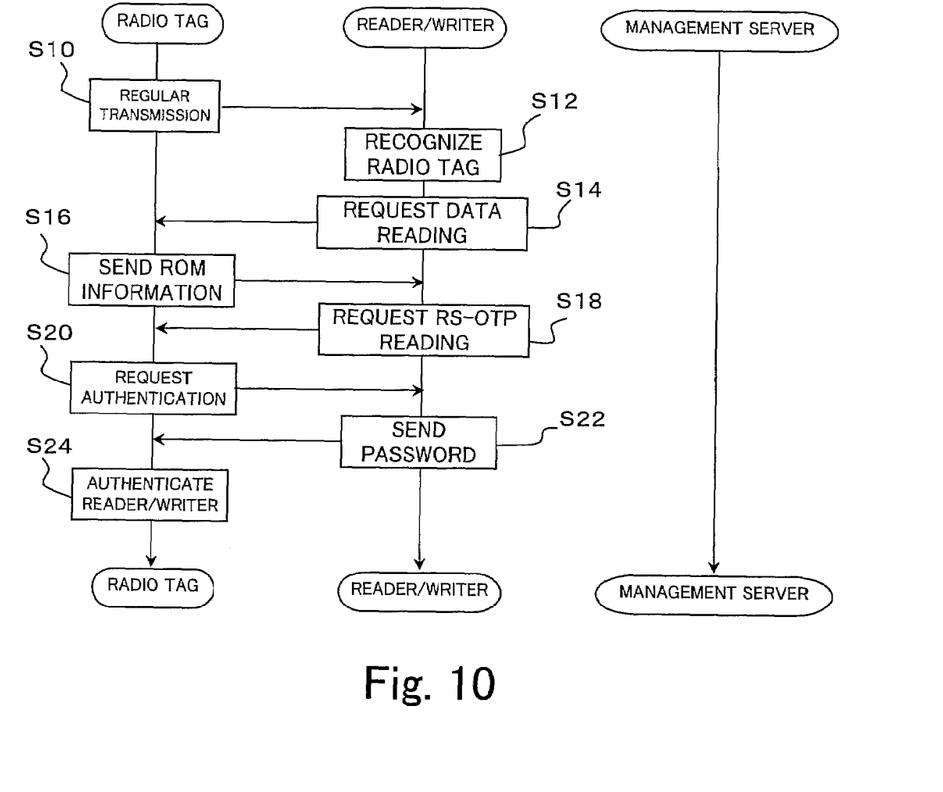
FIG. 10 is a message diagram showing a flow of communication between a radio tag and a reader/writer in an embodiment of the present invention.

FIG. 10 is a message diagram showing a flow of communication to be conducted between the radio tag 31 and the reader/writer 2 in this embodiment of the present invention.

Initially, communication is established. That is, the radio tag 31 regularly sends an electric signal every few msec in an attempt to establish communication with the reader/writer 2 (step S10). The reader/writer 2 having received an electric signal from the radio tag 31 recognizes the radio tag 31 (step S12), and sends a data reading request to the radio tag 31 (step S14).

The radio tag 31 in return sends its radio tag ID recorded in its ROM (step S16). The reader/writer 2 having received the radio tag ID sends an RS-OTP reading request to the radio tag 31 (step S18).

The radio tag 31, having received an RS-OTS reading request, sends an authentication request to the reader/writer 2 as authentication is yet to be established (step S20). In reply, the reader/writer 2 sends a password which is the radio tag ID subjected to confidential processing to the radio tag 31 (step S22). The radio tag 31 in turn compares the received password with the password recorded in itself beforehand, and when the passwords coincide to each other, the radio tag 31 authenticates the reader/writer 2 and establishes communication (step S24).

Figure 11:
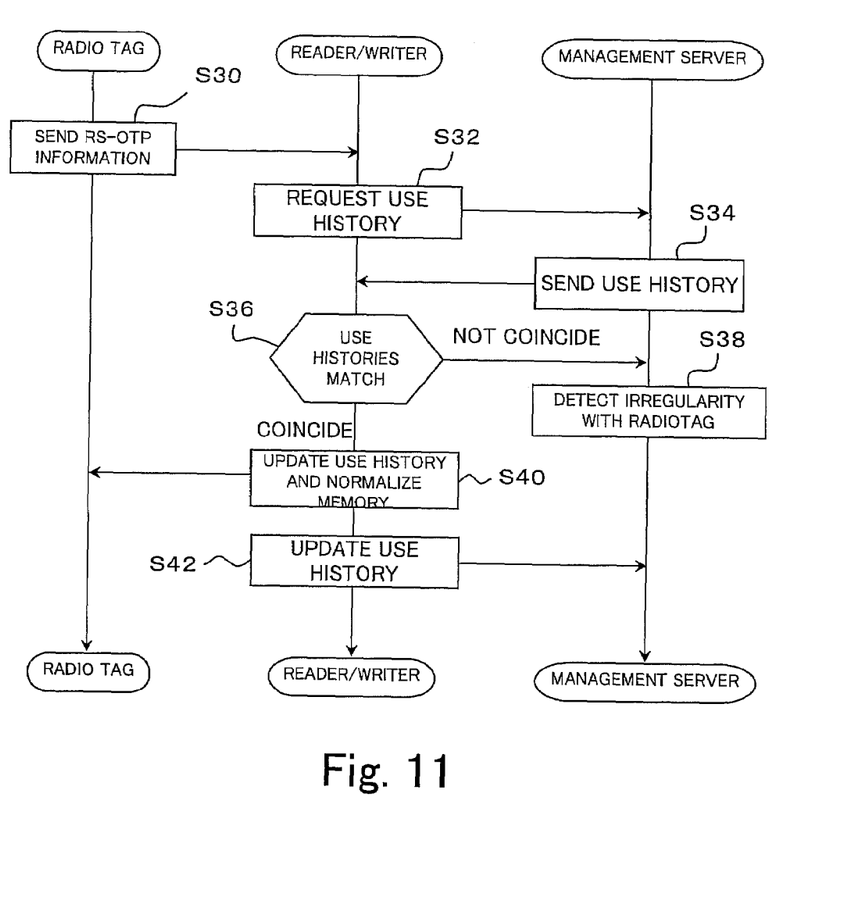
FIG. 11 is a message diagram showing a flow of communication between a radio tag, a reader/writer, and a management server in an embodiment of the present invention.

FIG. 11 is a message diagram showing a flow of communication conducted among a radio tag, a reader/writer, and a management server in this embodiment of the present invention. Specifically, after establishment of communication, writing and reading of use history is attempted. Initially, the radio tag 31 sends information, such as the pallet ID and the names of the owner, its own company, and so forth, which are recorded in the RS-OTP, and also use history to the reader/writer 2 (step S30).

The reader/writer 2, while temporarily storing the use history received from the radio tag 31, sends a use history transmission request to the distribution management server 10 (step S32). In response, the distribution management server 10 reads use history from its use history section DB61 and charge section DB62 and sends the use history to the reader/writer 2 (step S34).

The reader/writer 2 compares the use histories obtained respectively from the radio tag 31 and the distribution management server 10 (step S36). When the histories do not coincide, the reader/writer 2 informs the distribution management server 10 of irregularity of the radio tag 31. The distribution management server 10, in return, determines, while referring to the informed irregularity, whether the irregularity of the radio tag 31 is due to a hardware problem, manipulation, or so forth, for example (step S38).

When the use histories coincide at S36, the reader/writer 2 determines that the use histories are normal, and proceeds to step S40. When irregularity is determined, irregular information recorded in the memory of the distribution management server 20 is deleted to thereby reset the content of the memory to a normal state (S40). Further, the reader/writer 2 requests the distribution management server 10 to update the use history recorded therein (step S42). Thereupon, the processing is complete.

Figure 12:
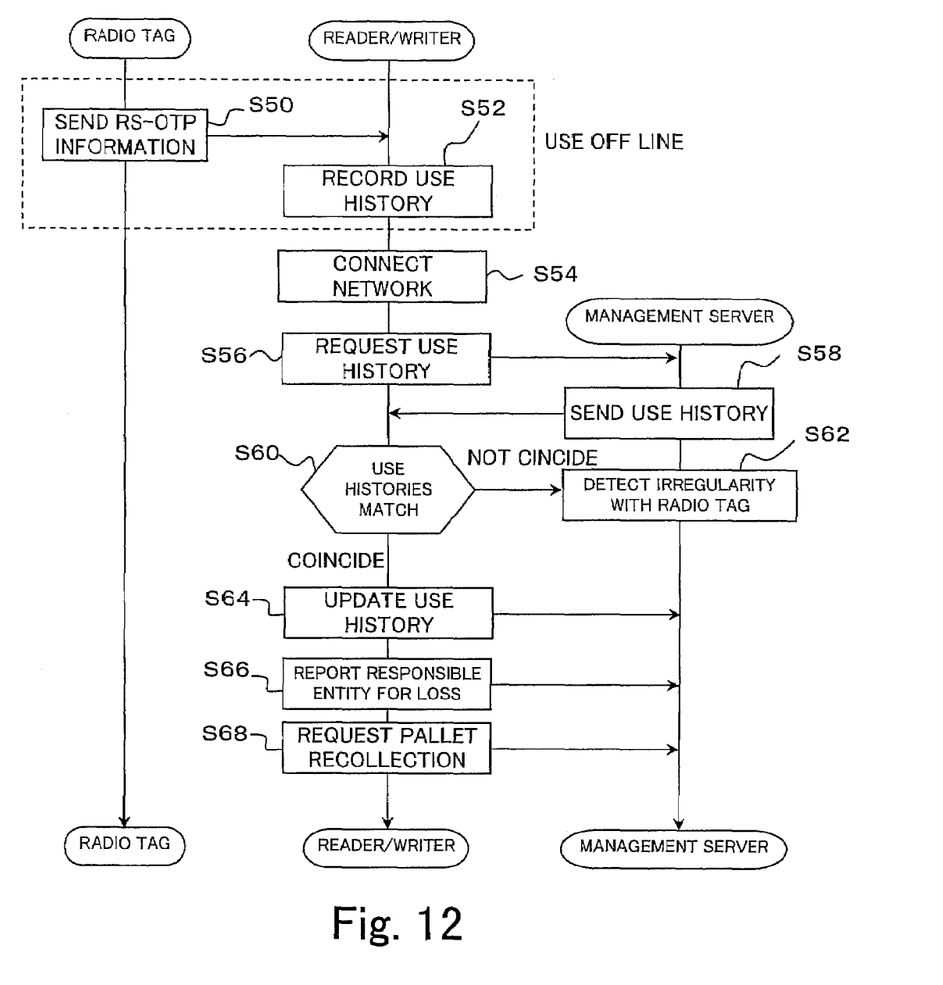
FIG. 12 is a message diagram showing a flow of communication conducted from finding to collection of a lost pallet in an embodiment of the present invention.

FIG. 12 is a message diagram showing a flow of communication to be conducted when a pallet is lost, found, and recollected in this embodiment of the present invention. The active-type radio tag 31 can communicate with a reader/writer 2 located within a range of about 10 m to 15 m.

In the following, processing to be followed when a lost pallet 20 is detected by a portable reader/writer 6 of a third party who participates in the distribution of the returnable pallet 20 will be described.

To avoid repeating explanation already given, only processing after establishment of communication is shown in FIG. 12. Initially, use history recorded in the RS-OTP is sent off-line to the reader/writer 6 (step S50) and stored therein (step S52).

Then, the portable reader/writer 6 is connected to a network (step S54), requests the distribution management server 10 to send the use history stored therein (step S56), and receives the use history sent from the distribution management server 10 (step S58). The reader/writer 6 compares the use histories obtained from the radio tag 31 and the distribution management server 10, and, when the records do not coincide, the management server 10 determines irregularity of the radio tag 31 (step S62).

When the records match, on the other hand, the portable reader/writer 6 requests the distribution management server 10 to update the use history recorded therein based on the use history obtained off-line (a lost pallet stored) from the radio tag 31 and informs the distribution management server 10 of the party who loses the pallet 20, which is found in a place not recorded in its use history, to thereby report a person concerned that (step S66). Further, in order to return the pallet 20 to its proper storage place, the reader/writer 6 sends a return request to the distribution management server 10. Thereupon, the relevant series of processing steps are complete.

Next, a case in which a pallet 20 is found by a third party who is not associated with either the pallet owner or the corporate group will be described.

A password disclosed at the step of authentication is sent from the reader/writer 2 of the third party to the radio tag 31. Upon receipt of the password, the radio tag 31 determines that the pallet, which was missing for a period of time exceeding a predetermined period of time, that is, was lost, has been found, and sends the reader/writer 2 data which is necessary for the reader/writer 2 to notify the distribution management server 10 of the finding of missing pallet 20. The reader/writer 2 connects, either on-line or off-line, to the distribution management server 10 and sends the radio tag ID thereto. Further, the reader/writer 2 receives the address data of the recorded last user of the pallet 20 from the distribution management server 10, and requests the operator of the reader/writer 2 to return the found pallet 20 to the last user.

As described above, the present invention may prevent loss and diversion of a pallet 20 to thereby save the pallet owner from the damage they would have experienced were the pallet 10 lost or diverted. This can produce an advantage that a pallet can be used at less cost as compared to a rental pallet.

Further, efficiency in using the pallet 20 may be improved, and transportation and storage of empty pallets can be reduced. This promotes returnable use of a pallet 20 and, thus, reduction of use of disposable pallets, which leads to reduction of burden on the environment.

It should be noted that the above-described embodiments can be modified as described below. These modified embodiments can also be combined as desired.

Modification 1

Although the distribution management server 10 charges a user for every use in the above described embodiments, the distribution management server 10 may charge, when the users are changed, a new user with an initial charge and refund the previous user an amount of money corresponding to a difference between the initial charge paid by the previous user and the initial charge imposed on the new user. This arrangement is advantageous in that, should the pallet 20 be lost, the current price of the pallet 20 can be collected without waiting for a notice informing that the missing pallet 20 has been found.

Modification 2

Although the distribution management server 10 charges a user for each use in the above described embodiments, the distribution management server 10 may charge a user for use of the pallets according to the period of time in which the user uses the pallet. Specifically, every time a pallet passes to a new user, a period of time obtained by subtracting a period from the first use of the pallet after manufacturing thereof to the moment of passing the pallet to the new user, from an estimated use period, or the service life, of the pallet, and the new user is charged while regarding the obtained period of time as his use period.

This arrangement encourages the user to actively utilize the pallet to thereby enhance the operating rate of the pallet per a predetermined period of time, reducing a period of time with the pallet 20 kept idle. Similar to the first modified embodiment, an initial charge may be imposed on every new user.

Modification 3

Although the distribution management server 10 charges a user for each use in the above described embodiments, the distribution management server 10 may not charge a user registered as a member of the corporate group, but charge only a user not registered. In this case, the owner of the pallet 20 may act as a manager of the corporate group to manage charging in connection with the pallet 20.

Modification 4

Although a price corresponding to the value of the pallet left after depreciation is charged to a user as an initial charge in the above described embodiments, a cost which will be paid to the finder of a missing pallet 20, including a transportation fee necessary to return the missing pallet 20 and/or an incentive to encourage the finder to return the missing pallet 20, may additionally be charged. This arrangement can promote efficient utilization of even a fully depreciated pallet by collecting the pallet, if lost.

Modification 5

Although the distribution management server 10 having received a notice that a lost pallet 20 has been found asks the finder of the pallet 20 to send the pallet 20 to the last user of that pallet 20 in the above examples, the distribution management server 10 may alternatively display a list of a plurality of users registered in the corporate group to the party finding the pallet, along with a request that the finder send the pallet 20 to any one of the plurality of users.

Still alternatively, the distribution management server 10 may, while presenting information on transportation fee and time and so forth, request the finder to send the pallet 20 to anyone selected by the finder from among the users registered as a company group, based on the presented information.

Modification 6

The radio tag 31 may have a function for clearing its memory region in response to a particular command. The distribution management server 10 may send the particular command upon receipt of a notice from a third party, telling that a lost pallet 20 is found, and terminates the management of the received radio tag ID. The radio tag ID is initialized upon receipt of the particular command, which allows a third party to use that pallet 20 in a condition in which nothing is recorded in its memory region. That is, by transmitting a particular command from the distribution management server 10 upon receipt of a credit depending on the state of depreciation of the pallet 20, sale of the pallet 20 for an appropriate price can be completed.

Further, this arrangement makes collection at cost of a fully depreciated pallet 20 unnecessary. The particular command can be made unique to each of the radio tag IDs through encryption using, as a key, a unique password, a particular command, or a radio tag ID which is determined for each radio tag ID. This arrangement may prevent the pallet 30 from being reset by an unauthorized party and abused.

The entire disclosure of Japanese Patent Application No. 2005-070480 filed on Mar. 14, 2005 including the specification, claims, drawings, and abstract is incorporated herein by reference.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A pallet recycling system for managing a pallet to support pallet recycling, comprising:
    a managing section connected to a network to manage pallet distribution;
    a pallet including a radio tag, said radio tag recording and transmitting pallet distribution information; and
    a tag reader/writer to read out the pallet distribution information recorded in said radio tag, to write the pallet distribution information to said radio tag, and to communicates with said managing section,
    said radio tag having a read-only memory having a serial number of said radio tag recorded therein, a first dedicated memory region where information corresponding to a pallet owner information is recorded using said tag reader/writer, and a second dedicated memory region where user information is recorded using said tag reader/writer;
    said tag reader/writer writing to said first dedicated memory region of said radio tag updated pallet owner information.

2. The pallet recycling system according to claim 1, wherein said first dedicated memory region of the radio tag further records information corresponding to a company group which mutually uses the pallet.

3. The pallet recycling system according to claim 1, wherein use history of said pallet is written to and read from said second dedicated memory region.

4. The pallet recycling system according to claim 1, wherein reading from and writing to the radio tag is conducted when said pallet is shipped in and out.

5. The pallet recycling system according to claim 1, wherein the user information recorded in said second dedicated memory region is updated when the user of the pallet is changed.

6. The pallet recycling system according to claim 1, wherein the tag reader/writer transmits at least a pallet number, a name of the owner of said pallet, a name of a company group, the user information to the managing section connected to the network, and the managing section manages said pallet, goods on-board, a location, a user, use information.

7. The pallet recycling system according to claim 6, wherein, when a user of said pallet is changed to a different user, an initial charge is charged to the different user at the time the different user begins to use said pallet.

8. The pallet recycling system according to claim 6, wherein, when said pallet is used by user other than the owner of said pallet or the company group, the managing section manages a charge for use based on a period of time or frequency of use when said pallet is returned.

9. The pallet recycling system according to claim 8, wherein a route information of a pallet which is lost and found at a place de-routed from a distribution route is obtained using said tag reader/writer, and sent to said managing section connected to the network, and said managing section charges a last user of the lost pallet a monetary fee.

10. The pallet recycling system according to claim 6, wherein, when said pallet is used by the user other than the owner of said pallet or the company group, the managing section manages a charge for use such that an initial charge is imposed when the user begins using said pallet and that a charge determined depending on a period of time or frequency of use is subtracted from the initial charge.

11. The pallet recycling system according to claim 1, wherein the tag reader/writers are installed at a plurality of major gates through which said pallet passes.

12. The pallet recycling system according to claim 1, wherein, when said pallet is used by an entity other than the pallet owner or company group, the first and second dedicated memory regions of said pallet are cleared using a particular command sent from said managing section.

13. The radio tag according to claim 1, wherein said radio tag is an active-type radio tag incorporating a battery, said radio tag transmits and receives an electric wave of a UHF band from said tag reader/writer.

14. The pallet according to claim 1, wherein a part of a structural member of said pallet is removable, said radio tag is embedded in the structural member so as not to be removed, and said radio tag is recyclable together with the structural member.

15. A method for managing a pallet recycling system for managing a pallet to support pallet recycling, the pallet including a radio tag, the radio tag recording and transmitting pallet distribution information, the radio tag having a read-only memory having a serial number of the radio tag recorded therein, a first dedicated memory region where information corresponding to a pallet owner information is recorded, and a second dedicated memory region where user information is recorded, the method comprising:
    (a) reading, using a tag reader, pallet distribution information from the second dedicated memory region;
    (b) transmitting the pallet distribution information read from the second dedicated memory region to a managing section via a network;
    (c) comparing the pallet distribution information recorded in the second dedicated memory region of the radio tag and pallet distribution information recorded in a managing section;
    (d) updating the pallet distribution information in the managing section when the pallet distribution information recorded in the second dedicated memory region of the radio tag is different from the pallet distribution information recorded in the managing section;
    (e) acquiring distribution route information from the radio tag of the pallet; and (f) charging a recorded last user a monetary fee when the pallet is found to be de-routed according to the acquired distribution route information.

16. The method for managing a pallet recycling system according to claim 15, wherein the information read from and written to the radio tag is encrypted.

17. The method for managing a pallet recycling system according to claim 15, wherein, when it is determined that the first and second dedicated memory regions are empty, the information having been sent to the managing section is deleted.

18. The method for managing a pallet recycling system according to claim 17, further comprising (g) changing a serial number of the pallet recorded in the first dedicated memory region.

\* \* \* \* \*